United States Patent [19]

Terhune et al.

[11] 4,121,106

[45] Oct. 17, 1978

[54] SHIELDED REGENERATIVE NEUTRON DETECTOR

[75] Inventors: James H. Terhune; John P. Neissel, both of San Jose, Calif.

[73] Assignee: General Electric Company, San Jose, Calif.

[21] Appl. No.: 766,717

[22] Filed: Feb. 8, 1977

[51] Int. Cl.[2] .................. G01T 3/00

[52] U.S. Cl. .................. 250/390; 313/61 D

[58] Field of Search .................. 250/390, 391, 392; 313/61 R, 61 D

[56] References Cited

U.S. PATENT DOCUMENTS

| | | | |
|---|---|---|---|
| 3,385,988 | 5/1968 | Hyun | 250/390 X |
| 3,860,845 | 1/1975 | Gleason et al. | 313/61 D |

OTHER PUBLICATIONS

Feasibility Study of In-Core Neutron Flux Monitoring with Regenerating Detectors, by D. E. Hegberg, Jun. 1962, HW-73335.

*Primary Examiner*—Archie R. Borchelt

*Attorney, Agent, or Firm*—Ivor J. James, Jr.; Samuel E. Turner; Sam E. Laub

[57] ABSTRACT

An ion chamber type neutron detector is disclosed which has a greatly extended lifespan. The detector includes a fission chamber containing a mixture of active and breeding material and a neutron shielding material. The breeding and shielding materials are selected to have similar or substantially matching neutron capture cross-sections so that their individual effects on increased detector life are mutually enhanced.

14 Claims, 4 Drawing Figures

SHIELDED REGENERATIVE NEUTRON DETECTOR

BACKGROUND OF THE INVENTION

1. Field of the Invention

The invention is directed to an ion chamber type neutron detector and particularly such detectors used to measure the neutron flux in a nuclear reactor core.

2. Description Of The Prior Art

An example of an in-core neutron detector system of the type which the present invention may be employed is shown by G. R. Parkos et al. in U.S. Pat. No. 3,565,760.

Ion chamber type neutron detectors are well known and are shown, for example, by L. R. Boyd et al. in U.S. Pat. No. 3,043,954. Usually such chambers comprise a pair of spaced electrodes electrically insulated from one another with a neutron sensitive material and an ionizable gas therebetween. For example, in a fission type ion chamber the neutron sensitive material is a material such as uranium which is fissionable by neutrons. As neutrons induce fissions of the uranium in the chamber, the resultant fission products ionize the gas in proportion to the magnitude of the neutron flux in the chamber. When a direct current voltage is applied across the electrodes, an output current is created which is proportional to the amount of ionization and hence proportional to the neutron flux in the chamber.

An inherent and serious difficulty with presently known fission type ion chamber neutron detectors is their relatively limited lifespan due to depletion of the fissionable or active material therein. For example, in-core fission chamber neutron detectors presently being used have a lifespan of approximately 1.4 to 2 years and newer more advanced reactor core configurations having higher neutron flues are now being planned that could create conditions lowering neutron detector lifespan to approximately one year. Depletion of the active material in the neutron detector necessitates costly and time-consuming periodic replacement of the detectors.

Detector life cannot be lengthened merely by increasing the initial amount of active material in the detector. The amount of active material that can be used in the detector is limited by several factors including the need for a small active gas volume to minimize sensitivity to gamma radiation and the requirement that the coating of active material be sufficiently thin to allow escape of fission products into the active gas volume for contribution to the ionization process.

It has been recognized for some time that detector lifespan can be extended by combining with an initially active fissionable material a breeding material such as U-234, U-238, Pu-238, Pu-240 and Th-232 which upon capture of neutrons is converted to a fissionable isotope to thereby continuously replenish the active material of the detector. Such regenerative detectors have been suggested, for example, by D. E. Hegberg in a paper entitled "Feasibility Study of In-Core Neutron Flux Monitoring With Regenerating Detectors." HW-73335 Hanford Laboratories, June 1972 and O'Boyle et al. U.S. Pat. No. 3,742,274.

It is also known that a strong factor affecting the lifespan of an in-core detector is the magnitude of neutron flux in the region in which the detector is located in the core. Assuming sufficient detector sensitivity, detector lifespan can also be extended by reducing the magnitude of neutron flux to which detector is exposed.

In the prior art this has been accomplished by reducing the amount of neutron moderator in the vicinity of the detector and/or by surrounding the detector by a suitable neutron shielding material or a burnable poison material. However, these prior art methods of extending neutron detector lifespan have not sufficiently extended the lifespan of in-core neutron detectors.

Thus, it is the principal object of the present invention to provide an ion chamber type neutron detector with a usable lifespan far greater than those possible with prior art methods of extending detector lifespan.

It is another object of the invention to improve nuclear reactor operation economics by substantially reducing or eliminating costly and time-consuming periodic replacement of in-core neutron detectors.

SUMMARY OF THE INVENTION

These and other objects of the invention are carried out by providing a neutron detector wherein a breeding material is mixed with the initial active material in the detector and wherein a suitable neutron shielding material is positioned to decrease the magnitude of neutron flux to which the active and breeding materials are exposed. According to the invention the breeding and shielding materials are selected to have similar or substantially matching neutron capture cross-sections whereby their individual effects in increasing detector lifespan are mutually enhanced.

DESCRIPTION OF THE PREFERRED EMBODIMENTS

Figure 1:
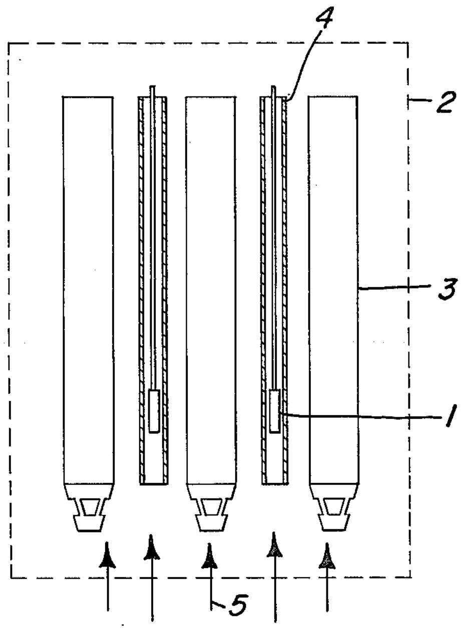
FIG. 1 is a schematic illustration of a neutron detector in a reactor core.

FIG. 1 schematically illustrates a plurality of detectors 1 positioned in a nuclear reactor 2 to monitor the neutron flux therein. As it is well known such a core comprises a plurality of spaced fuel assemblies 3 each containing a plurality of fuel elements or fuel rods containing a fissionable material such as U-235. Protective tubes 4 are positioned in spaces between the fuel assemblies 3 to receive detectors 1. A coolant, which is normally water, is circulated through the fuel assembly to extract heat therefrom in the direction indicated by the arrows 5. The tubes 4 may be sealed or may be open as shown to receive the flow of coolant past the detectors. In practice a number of detectors are distributed in a predetermined arrangement in the core including several detectors at different core elevations in each tube 4 to provide an accurate indication of the magnitude and distribution of the neutron flux in the core. Such a system is shown and described in fuller detail in the aforementioned U.S. Pat. No. 3,565,760.

Figure 2:
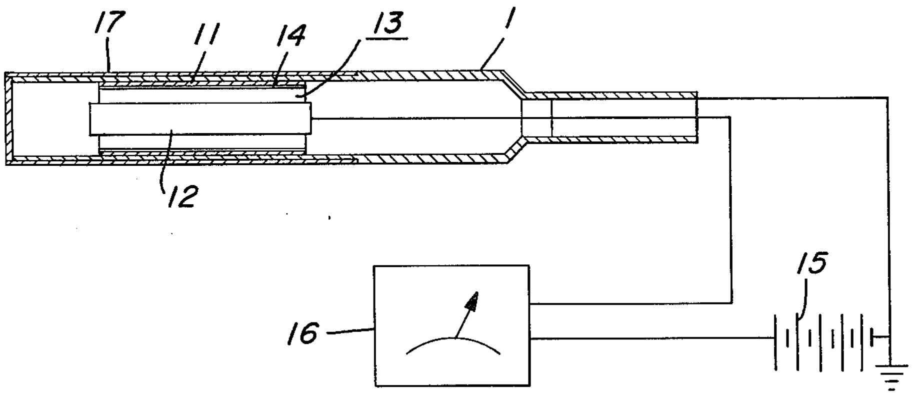
FIG. 2 is a schematic illustration of a neutron detector and a circuit connected thereto for measuring the neutron flux in a reactor core.

A detector 1 for use in a neutron detection system in accordance with the invention is shown schematically in FIG. 2. The detector 1 includes two spaced conductive electrodes 11 and 12. The space 13 between the electrodes 11 and 12 is sealed and filled with an ionizable gas, for example a noble gas such as argon. Carried on the surface of one or both of the electrodes 11 and 12 is a film, layer or coating 14 of a neutron activatable material, for example, fissionable uranium. In the presence of a neutron flux the coating 14 of fissionable material undergoes fission reactions at a rate proportional to the neutron flux. The resulting fission products cause ionization of the gas in space 13 in proportion with the number of fissions. A power supply 15 of appropriate voltage connected between electrodes 11 and 12 results in collection of ion pairs by the electrodes. This results in current flowing through the detector which is indicated on meter 16. The current indicated by meter 16 is proportional to the neutron flux in the chamber.

Whether the layer 14 is comprised of a single active material or a mixture of active and breeding materials, the lifespan of the detector is dependent on the rate of depletion of the active and breeding materials and therefore is dependent on the thermal and epithermal components of neutron flux in the chamber. Neutrons having energies less than 0.625 eV are commonly referred to as thermal neutrons and neutrons having energies greater than 0.625 eV are commonly referred to as epithermal neutrons. The present invention is based upon the recognition that by using both thermal and epithermal neutron flux depression and a mixture of active and breeding materials in the detector the lifespan of the detector may be extended to greater values than possible with either of the aforementioned prior art techniques individually employing breeding mixtures or shielding materials.

According to the invention the breeding and shielding materials are selected to have similar or substantially similar neutron capture cross-sections such that their individual effects in increasing detector lifespan are mutually enhanced. Practical embodiments of the invention employ a shielding material having a high neutron capture cross-section for thermal energy neutrons and having one or more neutron capture cross-section resonance peaks near the lowest energy neutron capture cross-section resonance peak of the breeding material. Referring to FIG. 2 the shielding material if normally added to the neutron detector 1 in the form of a sleeve 17 extending over the layer 14. The layer 14 is comprised of a mixture of active and breeding material, and the neutron capture cross-section of the shielding material of sleeve 17 is similar, or substantially similar to the neutron capture cross-section of the breeding material in layer 14. It has been found that by matching the neutron capture cross-sections of the breeding and shielding materials in such a manner a synergistic effect greatly increasing detector lifespan is achieved. It is projected that a detector having such a combination of active, breeding and shielding materials will have a lifespan as great as 10 years in the core of a nuclear reactor.

There are many possible combinations of active, breeding and shielding materials which may be employed with the invention. For example, in the case where U-234 is employed as a breeding material, an initial layer of U-234 mixed with U-235 is provided in the neutron detector. The U-235 serves as the initial fissionable or active material for the detector. Upon capture of a neutron the U-234 yields additional fissionable U-235. The rate at which the initial active material and the breeding material are depleted in the detector depends on the number of neutrons captured by the U-234 and U-235 atoms. It is known that the cross-section of U-234 is high at thermal energies less than 0.625 eV and that there is a large resonant peak at 5.19 eV. U-235 also has a large cross-section at thermal energies. Hence, the burn-up or depletion of U-234 and U-235 is produced largely by neutrons in these energy levels.

According to the invention a suitable shielding material, mixture or alloy of shielding materials, is provided which captures neutrons in either the thermal region, the epithermal, or resonance regions, or both. Shielding materials that are considered suitable for use in a regenerative neutron detector of the type employing a mixture of U-234 and U-235 are listed in TABLE 1 below which lists their cross-sections at 0.0253 eV and the location of their resonance peaks near 5.19 eV. In some cases a mixture or alloy of two or more of these materials may be used. The neutron capture cross-section of the shielding material at 0.0253 eV is listed as a measure of the material's ability to capture thermal energy neutrons. Since the U-234 resonant peak and any of the peaks in the table listed below have a finite width, perfect alignment of the peaks is not necessary to provide effective shielding from resonance capture of neutrons.

TABLE 1

| Shielding Material | Cross-Section at 0.0253 eV | Resonance Location |
|---|---|---|
| Iridium | 440 barns | 5.36 eV |
| Dysprosium | 930 | 5.45 |
| Erbium | 160 | 5.48, 5.98 |
| Thulium | 127 | 3.92 |
| Hafnium | 105 | 5.89, 5.68 |
| Boron | 759 | * |
| Silver | 64 | 5.19 |
| Gold | 99 | 4.91 |
| Lutetium | 108 | 4.8, 5.22 |
| Uranium -234 | 95 | 5.19 |

*No resonance peak but cross-section equals 53 barns at 5.19 eV.

Information appearing in the above table was derived from the following publications:

Donald J. Hughes & Robert B. Schwartz, "Neutron Cross Sections", Associated Universities Inc., Brookhaven National Laboratory, July 1, 1958, (BNL 325, Second Edition).

D. J. Hughes, B. A. Magurno, & M. K. Brussel, "Neutron Cross Sections", Associated Universities Inc., Brookhaven National Laboratory, Jan. 1, 1960, (BNL 325, Second Edition, Supplement Number 1).

J. R. Stehn, et al., "Neutron Cross Sections, Vol. I, z = 1 to 20", Associated Universities Inc., Brookhaven National Laboratory, May, 1964, (BNL 325, Second Edition, Supplement No. 2).

M. D. Goldberg et al., "Neutron Cross Sections, Vol. IIA, z = 21 to 40", Associated Universities Inc., Brookhaven National Laboratory, Feb. 1966, (BNL 325, Second Edition, Supplement No. 2).

M. D. Goldberg et al., "Neutron Cross Sections, Vol. IIB, z = 41 to 60", Associated Universities Inc., Brookhaven National Laboratory, May, 1966, (BNL 325, Second Edition, Supplement No. 2).

M. D. Goldberg et al., "Neutron Cross Sections, Vol. IIC, z = 61 to 87", Associated Universities Inc., Brookhaven National Laboratory, Aug., 1966, (BNL 325, Second Edition, Supplement No. 2).

J. R. Stehn et al., "Neutron Cross Sections, Vol. III, Z = 88 to 98", Associated Universities Inc., Brookhaven National Laboratory, Feb., 1965, (BNL 325, Second Edition, Supplement No. 2).

Figure 3:
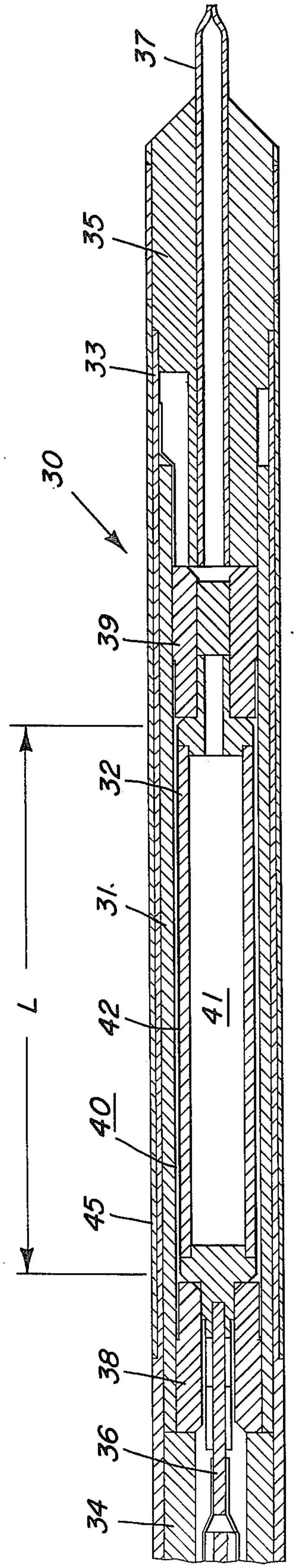
FIG. 3 illustrates a neutron detector incorporating one embodiment of the invention.

Referring to FIG. 3, a specific embodiment of a neutron detector employing the inventive concept is illustrated. The neutron detector comprises a sealed chamber 30 containing two spaced electrons 31 and 32. The sealed chamber 30 comprises a length of stainless steel tubing 33 sealed by end plugs 34 and 35. End plug 34 includes provision for passing an electrical conductor 36 and end plug 35 includes a pump-out tube 37. In this case the walls of the chamber 30 serve as the electrode 31. The electrodes 31 and 32 are maintained in insulated relationship of one another by ceramic insulating spacers 38 and 39 supported by end plugs 34 and 35, respectively. In this embodiment the center electrode 32 serves as an anode and is electrically connected to the electrical conductor 36 which runs axially through the chamber 30 to any suitable outside potential source. An ionizable gas such as hydrogen, argon or helium is disposed in the space 40 between the electrodes 31 and 32. In preferred embodiments the anode 32 is hollow, as shown in FIG. 3, and a hollow space 41 is filled with the ionizable gas to serve as a gas-compensating volume. A thin film 42 of a mixture of active and breeding materials is located on the surface of the anode 32. In other embodiments of the invention the inside diameter of the cathode 31 may carry the film 42, or both the cathode 31 and the anode 32 may include a film of the mixture of active and breeding materials. In the present case layer 42 is made up of a ratio ranging from 70:30 to 90:10 of a mixture of U-234 and U-235, respectively, which is deposited on the outside diameter of the anode 32. In preferred embodiments an 80:20 mixture of U-234 and U-235, respectively, is employed. The fissionable material may be deposited on either electrode 31 or 32 by electroplating, sputtering in a high vacuum or the like. As previously explained the exposure of this fissionable material to a neutron flux induces nuclear fission of the U-235 in proportion to the flux. The resultant high energy neutrons and fission products enter the ionizable gas adjacent the electrodes 31 and 32 creating gas ions and permitting a proportional current to flow through the detector.

According to the invention, a portion of the neutron detector is comprised of a shielding material having a neutron capture cross-section similar to or substantially matching the neutron capture cross-section of U-234. Examples of such shielding materials are listed in TABLE 1. In the present embodiment the shielding material is incorporated in the detector by provision of a sleeve 45 which extends beyond the active length L of the detector assembly. In other embodiments of the invention the walls of the chamber 30 and/or the electrodes 31 and 32 may simply be made from one of the shielding materials listed in TABLE 1. Of those shielding materials listed in TABLE 1 iridium and hafnium have neutron capture cross-sections most suitable for shielding the active and breeding mixture of U-234 and U-235. However, as between hafnium and iridium, hafnium is employed as a shielding material in the preferred embodiment since hafnium is about 3% of the cost of iridium and it is much easier to machine.

Figure 4:
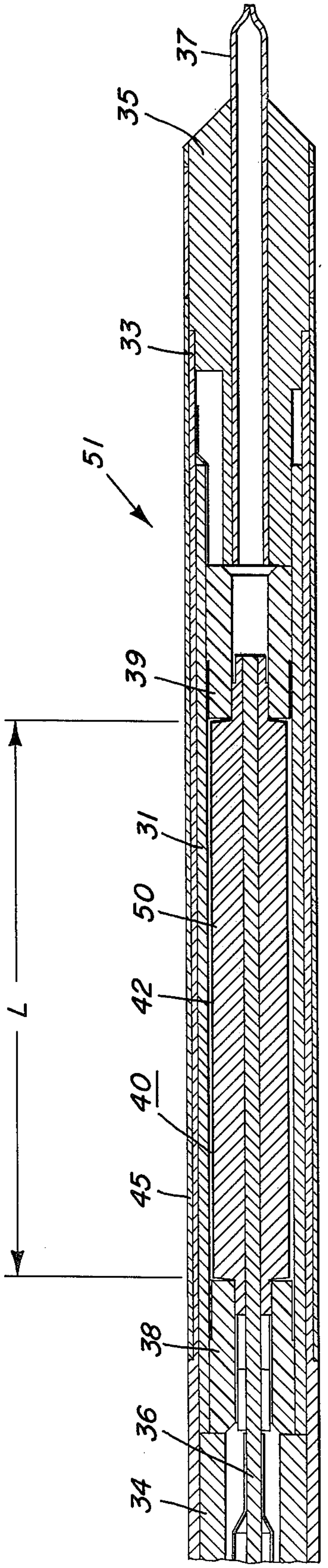
FIG. 4 illustrates another embodiment of the invention.

Detectors having a hollow anode 32, such as that illustrated in FIG. 3, are preferred since the hollow anode provides a gas-compensating volume which serves to significantly improve detector linearity. However, the invention may also be employed with prior art neutron detectors of the type having a solid anode 50 such as that illustrated in FIG. 4. The detector 51 illustrated in FIG. 4 is in all respects the same as the detector illustrated in FIG. 3 with the exception that a solid anode 50 is employed in lieu of the hollow anode 32 utilized in the embodiment shown in FIG. 3. The same numerals have been used to designate like components in the embodiments shown in FIGS. 3 and 4.

Other modifications of the apparatus and its use may be employed by those skilled in the art without departing from the invention and it is intended by the appended claims to cover these and other modifications.

What is claimed as new and desired to be secured by the Letters Patent of the United States is:

1. A neutron detector comprising:

a sealed chamber having two spaced electrodes positioned therein;

an ionizable gas disposed within the space between said electrodes;

a layer of a mixture of an active material and a breeding material positioned within said chamber, said active material and said breeding material being U-235 and U-234, respectively; and a portion of said detector being formed of a shielding material positioned to decrease the neutron flux to which the active material and the breeding material are subjected, said breeding and shielding materials having substantially matching neutron capture cross-section curves, whereby their individual effects on detector life are mutually enhanced.

2. The neutron detector of claim 1, wherein said mixture of an active and a breeding material is comprised of a ratio ranging from 70:30 to 90:10 of a mixture of U-234 and U-235, respectively.

3. The neutron detector of claim 2, wherein said mixture of an active material and a breeding material comprises a 80:20 mixture of U-234 and U-235, respectively.

4. The neutron detector of claim 1, wherein said shielding material has a high neutron capture cross-section at 0.0253 eV and a resonance peak near 5.19 eV.

5. The neutron detector of claim 1, wherein said shielding material is a material selected from the group consisting of iridium, dysprosium, erbium, thulium, hafnium, boron, silver, gold, lutetium, and uranium-234.

6. The neutron detector of claim 1, wherein said shielding material is a mixture of two or more of the materials selected from the group consisting of iridium, dysprosium, erbium, thulium, hafnium, boron, silver, gold, lutelium, and uranium-234.

7. The neutron detector of claim 1, wherein said shielding material is a material selected from the group consisting of iridium and hafnium.

8. The neutron detector of claim 1, wherein said shielding material is hafnium.

9. The neutron detector of claim 1, wherein said chamber is made of a shielding material.

10. The neutron detector of claim 1, wherein said chamber further includes an active length and a sleeve made of a shielding material extending beyond the active length of said chamber.

11. The neutron detector of claim 1, wherein one of said electrodes is made of a shielding material.

12. The neutron detector of claim 1, wherein one of said electrodes includes a layer of said mixture of an active material and a breeding material.

13. The neutron detector of claim 1, wherein each of said electrodes includes a layer of said mixture of an active material and a breeding material.

14. The neutron detector of claim 1, wherein both of said electrodes are made of a shielding material.

* * * * *